United States Patent [19]

Kawaguchi et al.

[11] 4,409,770
[45] Oct. 18, 1983

[54] VACUUM INSULATION SPACER

[76] Inventors: Genbee Kawaguchi, 8-3, Higashitamade 1-chome, Nishinari-ku, Osaka-City, Osaka; Kiyoshi Nagai, 10-15, Mondonishimachi, Nishinomiya-City, Hyogo-Prefecture, both of Japan

[21] Appl. No.: 199,170

[22] Filed: Oct. 22, 1980

[30] Foreign Application Priority Data

Feb. 6, 1980 [JP] Japan .................................. 55-12527

[51] Int. Cl.³ ...................... B65D 25/18; B65D 90/02; E04C 2/36
[52] U.S. Cl. ........................................ 52/666; 52/668; 52/807; 220/422; 220/423; 220/425; 220/445
[58] Field of Search ............... 220/420, 425, 445, 421, 220/422, 423, 424; 428/72, 116, 120, 119; 52/820, 666, 668, 807

[56] References Cited

U.S. PATENT DOCUMENTS

| 2,327,265 | 8/1943 | Herr ................................ 428/119 X |
| 2,662,043 | 12/1953 | Clements ................................ 52/807 |
| 2,762,736 | 9/1956 | Beuglet ........................... 220/420 X |
| 2,999,366 | 9/1961 | La Faue et al. ................. 220/422 X |
| 3,009,600 | 11/1961 | Matsch ................................ 220/423 |
| 3,130,112 | 4/1964 | Anderson, Jr. ................. 428/119 X |
| 3,533,894 | 10/1970 | Engelbrecht et al. ............ 52/668 X |
| 3,946,892 | 3/1976 | Rigal et al. ........................ 220/445 |

FOREIGN PATENT DOCUMENTS

| 2057969 | 6/1972 | Fed. Rep. of Germany ...... 428/119 |
| 853251 | 3/1940 | France ............................... 220/445 |
| 5413059 | 1/1977 | Japan . |
| 5463543 | 5/1977 | Japan . |
| 51-92461 | 8/1977 | Japan . |

Primary Examiner—Allan N. Shoap
Attorney, Agent, or Firm—Griffin, Branigan & Butler

[57] ABSTRACT

Various embodiments of vacuum insulation spacers include supporters comprising crosspiece members formed of insulating material and having rectangular cross section. The spacers have at least three supporting levels. The crosspiece members of each level are positioned so that contact points between crosspiece members of a selected level and an adjacent level on a first side of the selected level do not overlap contact points between crosspiece members of the selected level and an adjacent level on a second side of the selected level.

1 Claim, 4 Drawing Figures

VACUUM INSULATION SPACER

BACKGROUND

The present invention relates to insulation spacers which support two walls of a vacuum insulation structure.

It is widely known that vacuum insulation is an excellent means for keeping temperature either high or low. However, since considerable pressure is applied to a vacuum insulation structure as its internal pressure is reduced (when its interior is evacuated), its walls need to be sufficiently strong.

For the walls to be strong, materials comprising the walls must have high mechanical strength. Often the walls end up being fairly thick. Unfortunately, wall thickness reduces the possibility of constructing large size vacuum insulation structures.

To overcome these disadvantages points, vacuum insulation structures which withstand high outer pressure applied to their walls were disclosed to the public in a Japanese patent application having laid-open No. 1979-63453. These structures have a honeycomb-shaped spacer made of insulation material inserted between their two walls. By utilizing a honeycomb-shaped spacer, the walls are not collapsed by atmospheric pressure when the interior is evacuated. Thus, deformation of the walls is prevented.

A shortcoming of the above-described structure, however, is the fact that heat is transferred by conduction through the honeycomb-shaped spacer composed of plate-shaped structures, so that the effectiveness of the vacuum insulation is greatly reduced.

In addition, another shortcomming of the structure described above is the difficulty in evenly reducing pressures throughout the spacer as air is evacuated therefrom.

In view of the above shortcommings, the development of a spacer for a vacuum insulation structure which both (1) has less heat transfer and (2) requires less work during evacuation has long been awaited.

SUMMARY OF THE INVENTION

An object of the present invention is the provision of a spacer for use in a vacuum insulation structure which minimizes heat transfer and improves the effectiveness of insulation.

Another object of the present invention is the provision of a spacer for use in a vacuum insulation structure which is easily fabricated at a low cost.

Yet another object of the present invention is the provision of a spacer for use in a vacuum insulation structure which has high mechanical strength and which is able to withstand atmospheric pressure when air is evacuated.

In one embodiment of the present invention, a spacer is formed by aligning a number of crosspieces (made from insulating material and having a rectangular cross section) in the shape of lattice. Other embodiments utilize combinations of the crosspieces described above. In each embodiment the crosspieces are mounted alternatively in three or more levels so that upper and lower contact points between crosspieces of a sandwiched crosspiece will not overlap.

DETAILED DESCRIPTION OF THE EMBODIMENT

Figure 1:
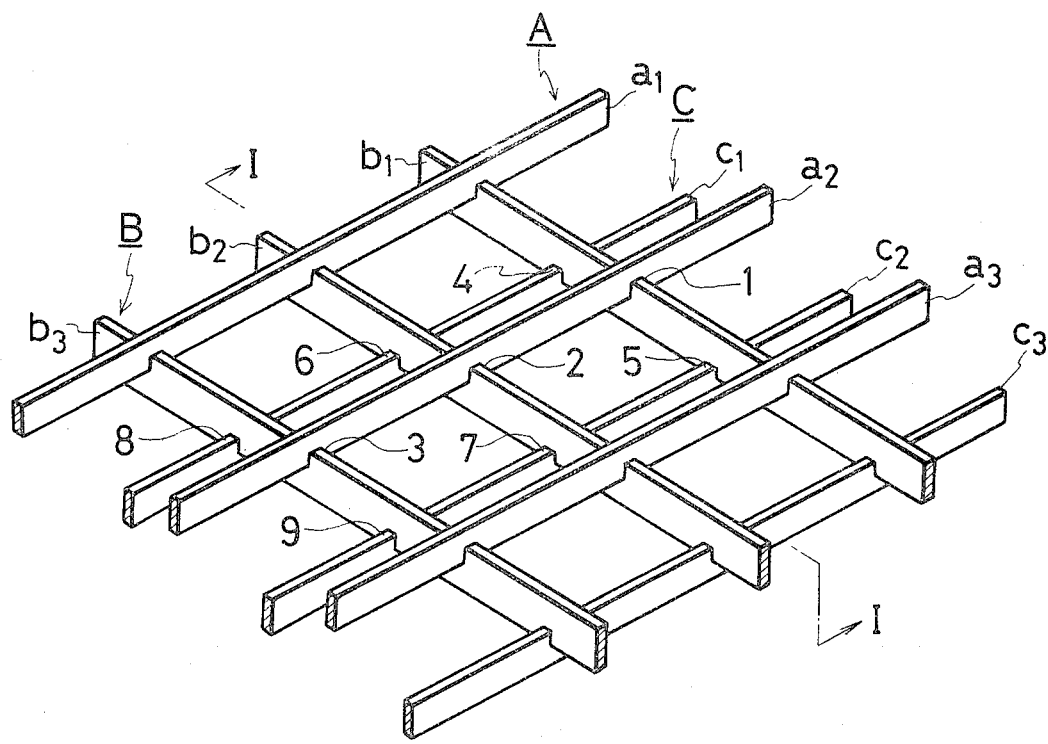
FIG. 1 is a perspective view illustrating a first embodiment of an insulation spacer according the present invention.

FIG. 1 illustrates a first embodiment of a spacer of the present invention. Crosspieces $c_1$, $c_2$, and $c_3$, each having a rectangular cross section and made from insulating material, are aligned in parallel to form a supporter in a first level. A supporter in a second level, which is constructed by crosspieces $b_1$, $b_2$, and $b_3$, aligned at right angles to those of the first level, is mounted on top of the supporter in the first level. Furthermore, a supporter in a third level, which is constructed by crosspieces $a_1$, $a_2$, and $a_3$, aligned at right angles to those of the second level, is mounted on top of the supporter in the second level.

FIG. 1 also illustrates that the contact points between the supporter in the second level and the supporter in the third level (mounted upon the second level) are alternatively placed with respect to the contact points between the supporter in the second level and the supporter in the first level (placed under the second level), so that the upper and lower contact points of the supporter in the second level with those of other levels will not be overlapped. That is, the contact point 2 between crosspiece $a_2$ of the supporter in the third level and crosspiece $b_2$ of the supporter in the second level is placed half way between the contact points 6 and 7 (contact points 6 and 7 being where crosspiece $b_2$ of the supporter in the second level contacts crosspieces $c_1$ and $c_2$, respectively, of the supporter in the first level) and is also placed on the opposite side of crosspiece $b_2$ from contact points 6 and 7.

Figure 2:
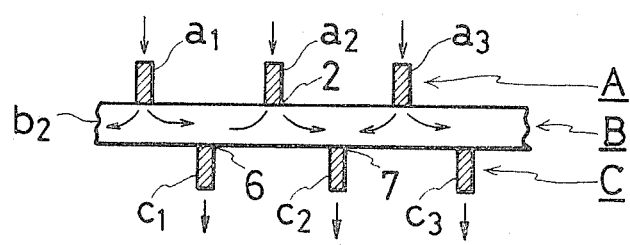
FIG. 2 is a cross-section view of FIG. 1 taken along the line I—I, wherein heat flow is indicated by arrows.

As further illustrated in FIG. 1, the crosspieces $b_1$ and $b_2$ are similarly related in the same way. This relation is also shown in FIG. 2, which is a sectional view of FIG. 1 taken along the line I—I.

Although not illustrated, there exist heat transfer surface(s) contacting both the upper parts of crosspieces $a_1$, $a_2$, and $a_3$ of the supporter in the third level and the lower parts of crosspieces $c_1$, $c_2$, and $c_3$ of the supporter in the first level.

After air in the space between two heat transfer surfaces is withdrawn so that a vacuum exists between the surfaces, heat is transfered mainly (1) by conduction through whatever supporter structure may be provided, (2) by radiation through the evacuated space; and (3) by convection (that is, by means of the mean free path of gas molecules remaining the evacuated space) By way of example, if an upper heat transer surface is at a higher temperature than the lower heat transfer surface, heat transfer occurs throughout all points where the upper heat transfer surface contacts the crosspieces located in the third level. However, thereafter heat has to be transfereed through reduced areas at the contact points 2 with a supporter in the second level. Heat transferred through the contact points then moves laterally through the supporter in the second level, and then through the supporter in the first level (via contact points with the supporter in the first level) to the lower heat transer surface. That is, as shown in FIG. 2, heat is transfered to crosspiece $b_2$ in the second supporter from crosspiece $a_2$ in the third supporter via contact point 2; is diffused to right and left sides; and, is then transferred to crosspieces $c_1$ and $c_2$ of the supporter in the third level via contact points 6 and 7.

In the case of a conventional one-level spacer (such as the honeycomb-shaped spacers described above), the areas of heat transfer for both upper and lower sides of the surface are the areas where the spacer structure contacts both heat transfer surfaces, and the distance of heat transfer is the length of the straight line connecting both heat transfer surfaces. For the insulation spacer of FIG. 1, however, contact points of supporters are not overlapped, so that heat transfer is considerably reduced due to the minimized heat transfer areas at the contact points of supporters in each level. Further, the distance of heat transfer is extended through supporters in the second level.

Materials suitable for use as supporters for the present invention (that is, as an insulation spacer) are those of poor heat conductivity such as, for instance, thermosetting resins like epoxy resin, bakelike, urea resin, etc., or thermoplastic resins like polypropylene, high density polyethylene, polyester, ABS resin, etc., or impregnated paper or pulp reinforced with resin. Naturally, in selecting the proper material the temperature for use of the vacuum insulation structure has to be measured, and heat durability of the material has to be taken into consideration. Ceramics are especially recommended when the vacuum insulation structure is used under high temperature conditions.

It is recommended that contact points of each level be stacked together with glue or asembled like mullion, fitting firmly into each other, to make them solid and structurally stable. Another possible method of fabrication is an integral molding using a mold.

The strength of the materials used for both walls determines how wide or how narrow the intervals between adjacent crosspieces which comprise a supporter in each level should be. When the intervals between adjacent crosspieces are narrow, the volume of heat transfer through spacers increases considerably. The thinner the thickness of the crosspieces comprising a supporter, the less the volume of heat transfer. However, the mechanical strength required for a spacer is a factor in deciding the thickness of the crosspieces. In the case of a spacer made of synthetic resin, it is considered adequate that an average thickness of a supporter be 1-2 mm; with 10-50 mm intervals between adjacent supporters.

Figure 3:
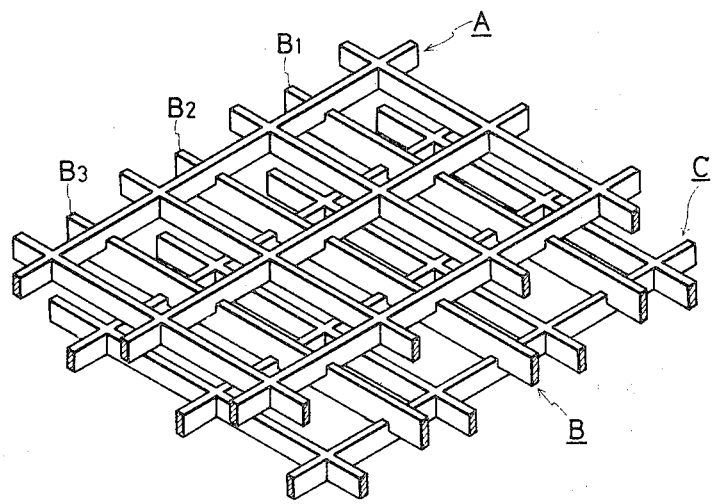
FIG. 3 is a perspective view of an insulation spacer with a three-level structure according to a second embodiment of the invention; and, FIG. 4 is a perspective view of an insulation spacer with a four-level structure according to a third embodiment of the invention.

FIG. 3 also illustrates an example of a insulation spacer of the present invention. Both supporters A and C in the third and first levels, respectively, are formed with insulation crosspieces having a rectangular cross section but configured in the shape of lattice. The lattice-shaped supporters in the third and first levels, as shown in FIG. 3, support the walls of an insulation structure and reinforce the walls against an outer pressure. Supporter B in the second level is formed by aligning insulation crosspieces $B_1$, $B_2$ and $B_3$ (having a rectangular cross section) in parallel.

Figure 4:
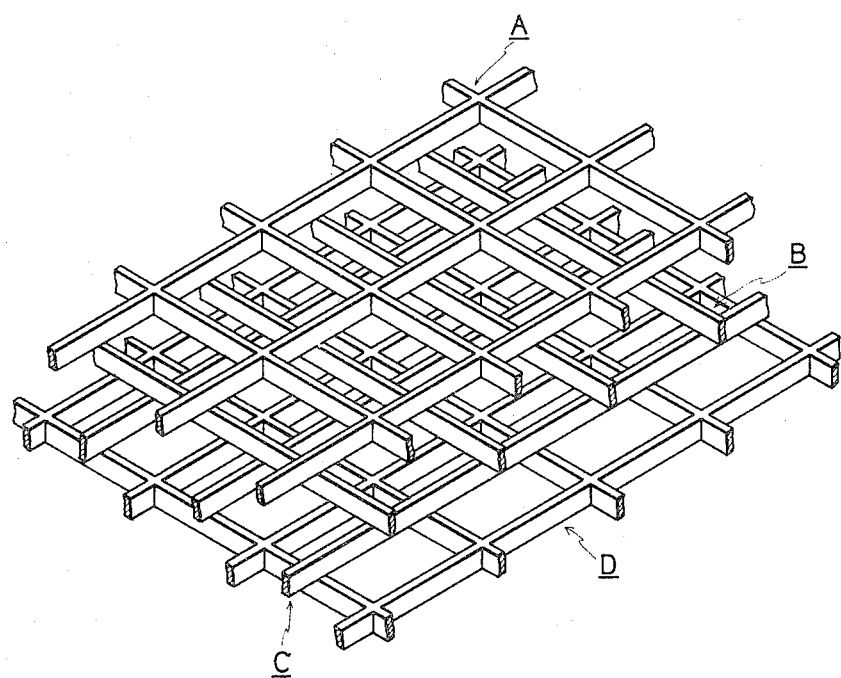

FIG. 4 depicts a four-level insulation spacer (according to another embodiment of the present invention). In this example both supporters D and A in the first and fourth levels, respectively, which face walls of an insulation structure, are constructed in the shape of a lattice. Both supporters C and B in the second and third levels, respectively, are formed by aligning crosspieces in parallel without contact points being overlapped in each level. In constructing this four-level structure, the first and second levels can be integrally molded using thermoplastic resign, for instance. This integraly molded supporter can reversely be utilized as the third and fourth levels. If not moled, the supporters can simply be placed one on or the other, or preferably glued together to form a four-level insulation spacer.

An insulation spacer of the present invention is insertable between both walls of a vacuum insulation structure to support and reinforce the walls. Since each space in the supporter is not blocked, evacuation is easily accomplished, and perlite or aerogel powder, which is commonly used for vacuum insulation, can also be filled in with ease.

The mean free path of the gas molecules remaining in the space becomes shorter by filing perlite into the vacuum space, which reduces the direct heat transfer of the gas molecules, resulting in improved effectiveness of the vacuum insulation.

Furthermore, aluminum foils which reflect heat can be inserted between levels of a spacer constructed with three levels or more, thus reducing heat transfer by radiation.

Insulation spacers according to the present invention can be used not only for insulation levels with flat structure but also for cylindrical or spherical insulation structures. Needless to say, a supporter has to be adapted to fit a curved surface.

A supporter need not necessarily abutt across the entire structure. Instead, it can abutt parts of the structure where additional reinforcement is required. An example of the above case is a spacer used on the bottom of a vacuum bottle to support the weight of an inside container, thus resulting in the effective reinforcement without reducing the effectiveness of insulation.

The test results of an insulation spacer in the present invention are as below:

A test was conducted using a vacuum insulation container in which an inner tank (300 mm × 300 mm × 400 mm) and outer tank (340 mm × 340 mm × 440 mm), both made with 1 mm thick stainless steel plates, were combined. A 20 mm thick spacer used for the test was inserted throughout the space between the inner tank and the outer tank. The space was evacuated to $6 \times 10^{-7}$ torr for vacuum insulation of the inner tank. A device was equipped to take the temperature of water in the inner tank, and on top of the container an opening of 63.5 mm diameter was installed.

For the test, a insulation spacer made of phenolic-resin and comprising a four-level supporter was used, and the material had a cross sectional area of 2 mm × 5 mm, as shown in FIG. 4. Intervals of the lattice of supporters in the first and fourth levels of the insulation spacer used for this test were 30 mm, and intervals of crosspieces in parallel in the second and third levels were also 30 mm. Furthermore, an aluminum foil was inserted between the third and fourth supporters.

Eighteen liters of boiling water (which made the inner tank half full) was poured into the inner tank, and temperature changes of water were read with a thermocouple installed inside the inner tank. It was found that 6 hours were required for temperature to drop from 80° C. to 60° C. On the other hand, when the same container equipped with 20 mm thick honeycomb-shaped insulation spacer (made of phenolic resin, with 2 mm thick plates used, and intervals of the plates approximately 30 mm) was used, it took 4.5 hours for water temperature to drop from 80° C. to 60°. As the results indicate, an insulation spacer according to the present invention is more effective.

When the same container equipped with insulation material of 20 mm thick rigid foamed urethane is used, it took 2 hours for the water temperature to drop from 80° C. to 60° C. It was thus revealed that a vacuum insulation spacer in the present invention is especially superior in insulation characteristics.

We claim:

1. A vacuum insulation spacer for use between an upper surface and a lower surface of a vacuum insulation structure, said spacer having at least four supporting levels, each level comprising a plurality of members made from an insulating material and having a substantially rectangular cross section, each level including members which are not parallel to members included in an adjacent level, each level being positioned with respect to an adjacent level so that contact between any two levels occurs only between members of a first level and members which are not parallel with respect thereto in an adjacent level, said contact occuring at contact points between the levels, said four levels being positioned with respect to one another such that no two contact points are aligned in a dimension perpendicular to the plane of said levels, said nonalignment of said contact points serving to increase the resistance of said spacer to heat transfer both by lengthening the heat transfer path between said upper surface and said lower surface of said vacuum insulation structure and by reducing the degree of physical contact between adjacent levels.

* * * * *